(12) United States Patent
Liguori et al.

(10) Patent No.: US 9,266,979 B2
(45) Date of Patent: Feb. 23, 2016

(54) CATALYST COMPONENTS FOR THE POLYMERIZATION OF OLEFINS AND CATALYSTS THEREFROM OBTAINED

(75) Inventors: Dario Liguori, Forino (IT); Tiziano Dall'Occo, Ferrara (IT); Giampiero Morini, Padova (IT); Joachim Pater, Cocomaro di Focomorto (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 445 days.

(21) Appl. No.: 13/376,000

(22) PCT Filed: Jun. 16, 2010

(86) PCT No.: PCT/EP2010/058429
§ 371 (c)(1), (2), (4) Date: Dec. 2, 2011

(87) PCT Pub. No.: WO2010/146072
PCT Pub. Date: Dec. 23, 2010

(65) Prior Publication Data
US 2012/0077944 A1    Mar. 29, 2012

Related U.S. Application Data

(60) Provisional application No. 61/269,639, filed on Jun. 26, 2009.

(30) Foreign Application Priority Data

Jun. 18, 2009 (EP) .................................. 09163141

(51) Int. Cl.
| | |
|---|---|
| *B01J 31/00* | (2006.01) |
| *B01J 37/00* | (2006.01) |
| *C08F 4/02* | (2006.01) |
| *C08F 4/60* | (2006.01) |
| *C08F 4/44* | (2006.01) |
| *C08F 2/00* | (2006.01) |
| *C08F 10/00* | (2006.01) |
| *C08F 110/06* | (2006.01) |

(52) U.S. Cl.
CPC ............... *C08F 10/00* (2013.01); *C08F 110/06* (2013.01)

(58) Field of Classification Search
CPC ............. B01J 31/00; B01J 37/00; C08F 4/02; C08F 4/60; C08F 4/44; C08F 2/00
USPC .................................. 502/111; 526/142, 210
See application file for complete search history.

(56) References Cited

U.S. PATENT DOCUMENTS

| | | | |
|---|---|---|---|
| 4,399,054 A | 8/1983 | Ferraris | |
| 4,452,914 A | 6/1984 | Coleman | |
| 4,469,648 A | 9/1984 | Ferraris | |
| 4,525,556 A | 6/1985 | Coleman et al. | |
| 4,601,994 A * | 7/1986 | Coleman, III | C08F 10/00 502/111 |
| 4,829,034 A | 5/1989 | Iiskolan | |
| 5,100,849 A | 3/1992 | Miya | |
| 5,733,987 A | 3/1998 | Covezzi et al. | |
| 2009/0306316 A1 * | 12/2009 | Morini et al. | 526/124.3 |

FOREIGN PATENT DOCUMENTS

| | | |
|---|---|---|
| EP | 0395083 | 11/1997 |
| EP | 01260524 | 11/2002 |
| WO | WO-9221706 | 12/1992 |
| WO | WO-9303078 | 2/1993 |
| WO | WO-98/44009 | 10/1998 |
| WO | WO-0078820 | 12/2000 |
| WO | WO-2008077770 A1 | 7/2008 |

* cited by examiner

*Primary Examiner* — David W Wu
*Assistant Examiner* — Elizabeth Eng

(57) ABSTRACT

Catalyst components for the polymerization of olefins $CH_2=CHR$ wherein R is hydrogen or a hydrocarbon radical having 1-12 carbon atoms, comprising Mg, Ti, Cl and a compound (L) or its derivatives, selected from condensed cyclic structures which are formed by at least an aromatic ring and which are substituted with at least two hydroxy groups, said Cl and Ti atoms being in an amount such as to have a molar ratio ranging from 5 to 50.

11 Claims, No Drawings

US 9,266,979 B2

CATALYST COMPONENTS FOR THE POLYMERIZATION OF OLEFINS AND CATALYSTS THEREFROM OBTAINED

This application is the U.S. national phase of International Application PCT/EP2010/058429, filed Jun. 16, 2010, claiming priority to European Application 09163141.6 filed Jun. 18, 2009 and the benefit under 35 U.S.C. 119(e) of U.S. Provisional Application No. 61/269,639, filed Jun. 26, 2009; the disclosures of International Application PCT/EP2010/058429, European Application 09163141.6 and U.S. Provisional Application No. 61/269,639, each as filed, are incorporated herein by reference.

The present invention relates to catalyst components for the polymerization of olefins $CH_2=CHR$, wherein R is hydrogen or hydrocarbon radical having 1-12 carbon atoms. In particular, the invention relates to catalyst components suitable for the preparation of homopolymers and copolymers of ethylene and to the catalysts obtained therefrom. Furthermore, the invention also relates to the achievement of ethylene homo or copolymers having high fluidity in the molten state and good morphological properties.

In particular, the present invention relates to a solid catalyst component, comprising titanium magnesium, halogen and a specific electron donor structure or derivatives thereof, having a specific combination of physical and chemical characteristics.

The MWD is a particularly important characteristic for ethylene (co) polymers, in that it affects both the rheological behavior and therefore the processability of the melt, and the final mechanical properties. Polyolefin having a broad MWD, particularly coupled with relatively high average molecular weights, are preferred in blow molding and high speed extrusion processing for example for the production of pipes or films. In fact, products characterized by broad MWD have superior mechanical properties that enable their use in applications in which high stress resistance is required. The processing conditions for these polymers are peculiar and in fact under those conditions a narrow MWD product could not be processed because it would present failures due to melt fracture.

As it is difficult to have available catalysts offering the right pattern of molecular weight distribution and average molecular weight, one of the most common methods for preparing broad MWD polymers is the multi-step process based on the production of different molecular weight polymer fractions in each step, sequentially forming macromolecules with different length.

The control of the molecular weight obtained in each step can be carried out according to different methods, for example by varying the polymerization conditions or the catalyst system in each step, or by using a molecular weight regulator. Regulation with hydrogen is the preferred method either working in suspension or in gas phase. This latter kind of process is nowadays highly preferred due to both the high qualities of the products obtained and to the low operative costs involved with it.

For a catalyst to perform in such a process, a critical step is that in which the low molecular weight fraction is prepared. In fact, one of important features that the catalyst should possess is the so called "hydrogen response", that is the extent of capability to reduce the molecular weight of polymer produced in respect of increasing hydrogen concentrations. Higher hydrogen response means that a lower amount of hydrogen is required to produce a polymer with a certain molecular weight. Performing well in the low molecular weight production stage also means having higher polymerization activity which allows to compensate for the depressive effect on the catalyst activity caused by relatively high hydrogen concentration.

In addition, due to the polymerization conditions and characteristics of the polymer produced in this step (intrinsically higher fragility), the catalyst/polymer system is often fragmented in very small particles that lowers the polymer bulk density and creates high amount of fines that makes difficult the operation of the plant particularly in the gas-phase polymerization. One of the ways to obviate to this problem would be performing the step of preparing the low molecular weight fraction after a first step in which the high molecular weight fraction is prepared. While this option may help in smoothing the plant operability, it surely causes worsening of the final property of the product which turns out to be less homogeneous. So, it would be another important feature of the catalyst that of having a suitable morphology resistance under low molecular weight gas-phase polymerization conditions.

One preferred way of producing morphology improvement in a catalyst is to modify its physical features in terms of porosity and surface area. For example in WO00/78820 are disclosed catalysts able to give ethylene polymers with broad MWD characterized by a total porosity (mercury method) preferably in the range 0.38-0.9 $cm^3/g$, and a surface area (BET method) preferably in the range 30-70 $m^2/g$. The pore distribution is also specific; in particular, in all the catalysts described in the examples at least 45% of the porosity is due to pores with radius up to 0.1 μm. The catalyst components are obtained by (a) a first reaction between a Ti compound and a $MgCl_2 \cdot EtOH$ adduct which has been subject to physical dealcoholation, (b) an intermediate treatment with an aluminum alkyl compound and (c) by a second reaction with a titanium compound. Also in this case the catalysts contain a substantial amount of titanium having a reduced oxidation state and in addition show a rather low amount of residual Al in the final catalyst. Notwithstanding the good performances under conventional polymerization conditions, it shows an unsatisfactory behavior under the demanding test conditions used by the applicant. This is also confirmed in the said document by the fact that when broad MWD polyethylene is prepared with two sequential polymerization stages, the low molecular weight fraction is always prepared in the second polymerization stage.

Use of electron donor compounds in the preparation of catalysts for ethylene polymerization usually causes the catalyst to become able to produce ethylene polymers with a narrow molecular weight distribution; however, it does not improve its morphological stability. Also, the presence of an internal donor usually worsens the hydrogen response.

U.S. Pat. No. 4,452,914 pertains to titanium complexes and/or compounds resulting from reacting (A) at least one titanium compound represented by the formula $Ti(OR)_x X_{4-x}$ wherein each R is independently a hydrocarbyl group having from 1 to about 20, preferably from about 1 to about 10, most preferably from about 2 to about 4 carbon atoms; X is a halogen and x has a value from zero to 4; with (B) at least one compound containing at least one aromatic hydroxyl group. The compound (B) can comprise condensed cyclic aromatic structures such as those represented by the numbers IV-VIII. Such compounds may also react with the titanium compound so as to form the complexes reported by the formulae XII-XIV. The catalyst preparation involves the use of a great excess of Cl atoms to improve the activities. The use of aluminum alkyl chlorinating agents (EADC) makes at least part of the titanium compound to be in the reduced state. The very high polymerization temperatures described in said reference cause the polymerization to be in solution and therefore provide no teaching as to the morphological stability of the catalysts.

It is therefore still felt the need of a catalyst having high morphological stability under the low molecular weight ethylene polymerization conditions while at the same time maintaining characteristics of high activity.

The applicant has found that such needs are satisfied by the use of a catalyst component comprises Mg, Ti, Cl and a compound (L) or its derivatives, selected from condensed cyclic structures which are formed by at least an aromatic ring and which are substituted with at least two hydroxy groups, said Cl and Ti atoms being in an amount such as to have a molar ratio ranging from 5 to 50.

As mentioned, the compound L includes derivatives obtainable by its reaction or complexation with inorganic metal containing Lewis acids. In particular, the compound L may interact with species having an Mg—Cl or Ti—Cl bond to form derivatives containing L—Mg or L—Ti bonds. Specifically, the hydroxyl groups of the compound L may interact with Mg and/or Ti species to form derivatives containing L-O—Mg or L-O—Ti bonds.

In addition to the aromatic ring, the compound L can include saturated rings condensed with the aromatic ones. In this case, preferably the compound L is selected from those in which the hydroxy groups are positioned on an aromatic ring of the di or polycyclic condensed structure. Still more preferably, the compound L comprises only aromatic di or polycyclic structures. It constitutes a preferred aspect of the invention the use of compound L selected from the said condensed cyclic structures in which the hydroxy groups are positioned in such a way that structure has no chelating capability. Preferably, the said hydroxy groups are not adjacent to each other.

In addition to the hydroxy groups, the said condensed cyclic structures can also be substituted with $R^1$ a group in which $R^1$ is a C1-C20 hydrocarbon group optionally containing a heteroatom. According to the present invention, the term heteroatom means any atom different from carbon and hydrogen.

Preferred structures are di or polyhydroxynaphthalenes, di or polyhydroxyfluorenes di or polyhydroxyindenes. Specific preferred compounds are, compounds are 1,5-dihydroxynaphthalene, 1,6-dihydroxynaphthalene, 1,7-dihydroxynaphthalene, 2,6-dihydroxynaphthalene and 2,7-dihydroxynaphthalene, 1,5-Dihydroxy-1,2,3,4-tetrahydronaphthalene.

Preferably, the amount of electron donor compound L is in molar ratio with respect to the titanium atoms ranging from 0.05 to 1 preferably from 0.1 to 0.8 and more preferably from 0.1 to 0.5.

Preferably, the catalyst components according to the present invention contain an amount of $OR^1$ groups in which $R^1$ is a C1-C20 hydrocarbon group, optionally containing heteroatoms, up to an amount such as to give a molar $OR^1$/Ti ratio lower than 0.5.

Preferably, the catalyst is also characterized by the fact that substantially all the titanium atoms are in valence state of 4. Throughout the present application the wording "substantially all the titanium atoms are in valence state of 4" means that at least 95% of the Ti atoms have a valence state of 4.

Preferably, the Cl/Ti molar ratio is lower than 30 and more preferably in the range 7-25. The amount of Ti is typically higher than 1.5% preferably higher than 3% and more preferably equal to, or higher than, 3.2% wt. Most preferably it ranges from 3.5 to 8% wt.

Depending on the preparation process, the final catalyst component may also contain aluminum atoms. In such a case, the Mg/Al molar ratio can range from 1 to 35, preferably from 3 to 30, more preferably from 4 to 20 and most preferably in the range 4-16. When present, the amount of Al is typically higher than 0.5% wt., preferably higher than 1% and more preferably in the range of from 1.2-3.5%. Preferably, the amount of Al is lower than that of Ti.

In addition to the above characteristics, the catalyst components of the invention preferably show a porosity $P_F$ determined with the mercury method higher than 0.40 $cm^3/g$ and more preferably higher than 0.50 $cm^3/g$ usually in the range 0.50-0.80 $cm^3/g$. The total porosity $P_T$ can be in the range of 0.50-1.50 $cm^3/g$, particularly in the range 0.60 and 1.20 $cm^3/g$.

The surface area measured by the BET method is preferably lower than 80 and in particular comprised between 10 and 70 $m^2/g$. The porosity measured by the BET method generally ranges from 0.10 and 0.50, preferably from 0.10 to 0.40 $cm^3/g$.

Preferably, in the catalyst component of the invention the average pore radius value, for porosity due to pores up to 1 μm, is in the range from 650 to 1200 Å.

The particles of solid component have substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

In a preferred aspect the catalyst component of the invention comprises, in addition to the compound L, a Ti compound having at least one Ti-halogen bond and a magnesium chloride. Optionally it may also contain an aluminum chloride, or more generally, an aluminum halide. As mentioned before, the catalyst component may also contain groups different from halogen, in any case in amounts lower than 0.5 mole for each mole of titanium and preferably lower than 0.3. Throughout the present application the term magnesium chloride means a magnesium compound having at least a Mg—Cl bond, the term aluminum chloride means an aluminum compound containing at least an Al—Cl bond and the term aluminum halide means an aluminum compound containing at least an Al—X bond, where X is Cl, Br or I.

The magnesium chloride is preferably magnesium dichloride and is more preferably in the active form meaning that it is characterized by X-ray spectra in which the most intense diffraction line which appears in the spectrum of the non active chloride (lattice distanced of 2,56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The preferred titanium compounds have the formula $Ti(OR^1)_n X_{y-n}$, wherein n is a number comprised between 0 and 0.5 inclusive, y is the valence of titanium, $R^1$ has the meaning given above and preferably is an alkyl, cycloalkyl or aryl radical having 1-8 carbon atoms and X is halogen. In particular $R^1$ can be methyl, ethyl, iso-propyl, n-butyl, isobutyl, 2-ethylhexyl, n-octyl and phenyl; X is preferably chlorine.

The aluminum halide can be chosen among those of formula $AlXM_2$ where X is halogen as previously defined and M can be, independently, $OR^1$ groups as defined above or halogen.

Preferably the aluminum halide is an aluminum chloride of formula AlClM$_2$ where M has the same meaning specified above. Preferably, M is chlorine.

The catalyst component of the invention can be prepared by various techniques. For example they can be prepared by compiling magnesium dichloride in an anhydrous state and the L compound under conditions in which activation of the magnesium dichloride occurs. The so obtained product can be treated one or more times with a suitable amount of TiCl$_4$. This treatment is followed by washings with hydrocarbon solvents until chloride ions disappeared.

According to another a particular embodiment, the solid catalyst component can be prepared by reacting a suitable amount titanium compound of formula Ti(OR$^1$)$_{n-y}$X$_y$, where n is the valence of titanium and y is a number between 1 and n, and R$^1$ has the meaning given above, preferably TiCl$_4$, with a magnesium chloride or a precursor thereof, in the presence of suitable amount of the L compound.

A particularly preferred method suitable for the preparation of spherical components mentioned above comprises a first step (a) in which a compound MgCl$_2$.m(R$^2$OH)tH$_2$O, wherein 0.3≤m≤1.7, t is from 0 to 0.6 preferably from 0.02 to 0.5 and R$^2$ is an alkyl, cycloalkyl or aryl radical having 1-12 carbon atoms is reacted with the said titanium compound of the formula Ti(OR$^1$)$_n$X$_{y-n}$, in which n, y, X and R$^1$ have the same meaning defined above.

In this case MgCl$_2$.mR$^2$OH represents a precursor of Mg dihalide. These kind of compounds can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained, it is convenient to first prepare adducts with more than 1.7 moles of alcohol per mole of MgCl$_2$ and then subjecting them to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP-A-395083.

Generally these dealcoholated adducts are also characterized by a porosity (measured by mercury method) due to pores with radius due to pores with radius up to 0.1 μm ranging from 0.15 to 2.5 cm$^3$/g preferably from 0.25 to 1.5 cm$^3$/g.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular TiCl$_4$. The reaction with the Ti compound can be carried out by suspending the adduct in cold TiCl$_4$ (generally 0° C.); the mixture is heated up to 80-140° C. and kept at this temperature for 0.5-8 preferably from 0.5 to 3 hours. The excess of titanium compound can be separated at high temperatures by filtration or sedimentation and siphoning.

In a second step (b) the compound L is contacted with the precursor obtained from the step (a) The contact is preferably carried out in an inert hydrocarbon as diluent at a temperature ranging from room temperature to the boiling temperature of the L compound, generally from 40 to 150° C. and preferably from 50° C. to 140° C. The compound L can be used in molar ratio with the Ti compound in the solid catalyst component coming from step (a) ranging from 0.01 to 5, preferably from 0.1 to 4 and more preferably from 0.1 to 2. According to this method, L compound becomes fixed on the catalyst component in variable amounts which may not be correlated with the effect on the morphological stability i.e., with the capability of the catalyst of producing high bulk density polymers even under demanding test conditions. In fact, the positive effect on the morphological stability is always present even when the amount of fixed donor is very low.

According to variance of the method, the step (a) is carried out in the presence of an aluminum compound of formula AlM$_3$ where M can be, independently, OR$^1$ groups as defined above or halogen. Preferably, at least one M is chlorine, more preferably two M are chlorine and most preferably all M are chlorine.

The aluminum compound, preferably AlCl$_3$, which is used in amounts such as to have Mg/Al molar ratio can range from 1 to 35, preferably from 3 to 30, more preferably from 4 to 20 and most preferably in the range 4-16. The so obtained product can then be subjected to step (b) as described above.

The catalyst components of the invention whatever is the method for their preparation, form catalysts, for the polymerization of alpha-olefins CH$_2$=CHR wherein R is hydrogen or a hydrocarbon radical having 1-12 carbon atoms by reaction with Al-alkyl compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

The catalyst components of the invention and catalysts obtained therefrom find applications in the processes for the preparation of several types of olefin polymers.

As mentioned above, the catalyst components of the invention are endowed with a particularly high morphological stability under high hydrogen concentration for the preparation of low molecular ethylene (co)polymer. Thus, they are particularly suitable use in cascade, or sequential polymerization processes, for the preparation of broad molecular weight ethylene polymers both in slurry and gas-phase. In general the catalyst can be used to prepare: high density ethylene polymers (HDPE, having a density higher than 0.940 g/cm$^3$), comprising ethylene homopolymers and copolymers of ethylene with alpha-olefins having 3-12 carbon atoms; linear low density polyethylene's (LLDPE, having a density lower than 0.940 g/cm$^3$) and very low density and ultra low density (VLDPE and ULDPE, having a density lower than 0.920 g/cm$^3$, to 0.880 g/cm$^3$ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight.

However, as previously indicated they are particularly suited for the preparation of broad MWD polymers and in particular of broad MWD ethylene homopolymers and copolymers containing up to 20% by moles of higher a-olefins such as propylene, 1-butene, 1-hexene, 1-octene prepared by cascade polymerization technology.

One additional advantage of the catalyst described in the present application is that it can be used as such in the polymerization process by introducing it directly into the reactor without the need of pre-polymerizing it. This allows simplification of the plant set-up and simpler catalyst preparation process.

The main polymerization process in the presence of catalysts obtained from the catalytic components of the invention can be carried out according to known techniques either in liquid or gas phase using for example the known technique of the fluidized bed or under conditions wherein the polymer is mechanically stirred. In case of liquid phase polymerization both continuous stirred tank reactors and liquid full loop reactors can be used. However, the preferred process is carried out in the gas phase fluidized bed reactor. Examples of gas-phase processes wherein it is possible to use the spherical components of the invention are described in WO92/21706, U.S. Pat. No. 5,733,987 and WO93/03078. In this process a pre-contacting step of the catalyst components, a pre-polymerization step and a gas phase polymerization step in one or more reactors in a series of fluidized or mechanically stirred bed are comprised even if as mentioned above, they are not strictly required with the catalyst of the invention.

Therefore, in the case that the polymerization takes place in gas-phase, the process of the invention is preferably carried out according to the following steps:
(a) contacting the catalyst components in the absence of polymerizable olefin or optionally in the presence of said olefin in amounts not greater than 20 g per gram of the solid component (A);
(b) gas-phase polymerization of ethylene or mixtures thereof with a-olefins $CH_2=CHR$, in which R is a hydrocarbon radical having 1-10 carbon atoms, in one or more fluidized or mechanically stirred bed reactors using the catalyst system coming from (a).

As mentioned above, in order to further broaden the MWD of the product, the process of the invention can be performed in two or more reactors working under different conditions and optionally by recycling, at least partially, the polymer which is formed in the second reactor to the first reactor. Usually, the two or more reactors work with different concentrations of molecular weight regulator or at different polymerization temperatures or both. Preferably, the polymerization is carried out in two or more steps operating with different concentrations of molecular weight regulator.

As already explained, one of the most interesting feature of the above described catalysts is the capability to produce ethylene polymers with low molecular weight, expressed by high melt index "E" value and good morphological properties expressed by high values of bulk density. In particular, the said ethylene polymers have Melt Index E higher than 50 and bulk densities higher than 0.35. Particularly preferred are those having MI"E" higher than 70 and bulk density higher than 0.37 and most preferred are those with MI"E" in the range 80-400 and bulk density in the range 0.35-0.6. When these kind of polymers are produced in the low molecular weight polymerization step of a multi-step process, they allow obtaining ethylene polymers having at the same time broad MWD usually expressed by a melt flow ratio (F/P) value over 20, preferably over 25 and more preferably over 35, which is the ratio between the melt index measured with a 21.6 Kg load (melt index F) and the melt index measured with a 5 Kg load (melt index P), determined at 190° C. according to ASTM D-1238, bulk density over 0.44, preferably over 0.46 and preferably good homogeneity expressed by a number of gels (determined by the method described in the characterization section) having diameter of higher than 0.2 mm of lower than 70 and preferably lower than 60. Moreover, preferably the films contain no gels with diameter higher than 0.5 mm. Once used in the production of films or pipes indeed, the polymers showed a very good processability while the extruded articles showed a very low number of gels. The polymer is obtained in form of spherical particles meaning that the ratio between the greater axis and the smaller axis is equal to, or lower than, 1.5 and preferably lower than 1.3.

The following examples are given in order to further describe and not to limit the present invention.

The properties are determined according to the following methods:

MIE flow index: ASTM-D 1238 condition E
MIF flow index: ASTM-D 1238 condition F
MIP flow index: ASTM D 1238 condition P
Bulk density: DIN-53194
Determination of Mg, $Ti_{(tot)}$ and Al: has been carried out via inductively coupled plasma emission spectroscopy (ICP) on a "I.C.P SPECTROMETER ARL Accuris".

The sample was prepared by analytically weighting, in a "fluxy" platinum crucible", 0.1÷03 g of catalyst and 3 gr of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then analyzed via ICP at the following wavelength: Magnesium, 279.08 nm; Titanium, 368.52 nm; Aluminum, 394.40 nm.

Determination of Cl: has been carried out via potentiometric tritration.

Determination of OR groups: via Gas-Chromatography analysis

Determination of compound L

The determination of compound L in the final catalyst has been carried out using standard NMR technique.

NMR Spectra were recorded at a Bruker AV200 spectrometer and referenced to the residual portion solvent peak for 1H. Chemical shifts are quoted in ppm relative to tetramethylsilane. All manipulations were performed in an inert-atmosphere $N_2$ glovebox. The samples were prepared by analytically weighing, 0.01÷0.02 g of catalyst in a 5 mm NMR tube, adding 0.5÷0.8 ml of acetone-D6 as solvent and a defined amount of a suitable internal standard (e.g. $CH_2Cl_2$).

The amount of compound L present in the catalysts was determined by the molar ratio between the internal standard added and the compound L. The molar ratio was calculated from the (normalized) 1H intensity peak of the aromatic portion of compound L (in the range 6.5÷8.5 ppm) and the intensity of the characteristic peak of the internal standard added (e.g. about 5.6 ppm for $CH_2Cl_2$).

As cross check, the same calculation was made for the —CH2- peak of ethoxyl group versus the peak of the internal standard. The amount of ethoxyl group found was in good agreement with the amount found by classic Gas-Chromatography analysis.

Ethylene Polymerization: General Procedure A.

A 4.5 liter stainless-steel autoclave equipped with a magnetic stirrer, temperature and pressure indicator, feeding line for hexane, ethylene, and hydrogen, was used and purified by fluxing pure nitrogen at 70° C. for 60 minutes. Then, a solution of 1550 cm³ of hexane containing 7.7 cm³ of 10% by wt/vol TiBAL/hexane was introduced at a temperature of 30° C. under nitrogen flow. In a separate 200 cm³ round bottom glass bottle were successively introduced, 50 cm³ of anhydrous hexane, 1 cm³ of 10% by wt/vol, TiBAL/hexane solution and 0.040÷0.070 g of the solid catalyst of table 1. They were mixed together, aged 10 minutes at room temperature and introduced under nitrogen flow into the reactor. The autoclave was closed, then the temperature was raised to 85° C., hydrogen (9 bars partial pressure) and ethylene (3.0 bars partial pressure) were added.

Under continuous stirring, the total pressure was maintained at 85° C. for 120 minutes by feeding ethylene. At the end the reactor was depressurised and the temperature was dropped to 30° C. The recovered polymer was dried at 70° C. under a nitrogen flow and analyzed. The obtained results are reported in table 2.

General Ethylene Polymerization Procedure (Procedure B)

The procedure is carried out under the same conditions disclosed for the procedure (A) with the only difference that triethylaluminum is used instead of triisobutylaluminum, the ethylene pressure is 7 bars and the hydrogen pressure is 3 bars.

Polymer Morphology:

The term broken means that at least 80% of polymer particles is broken;

The term spheres means that at least 80% of polymer particles is of regular morphology;

The term "broken+spheres" means a substantial equal proportion of broken and regular particles.

EXAMPLES

Preparation of the Spherical Support (Adduct MgCl₂/EtOH)

A magnesium chloride and alcohol adduct was prepared following the method described in example 2 of U.S. Pat. No. 4,399,054, but working at 2000 RPM instead of 10000 RPM. The adduct containing about 3 mols of alcohol and 3.1% wt of H₂O and had an average size of about 70 µm. The adduct were subject to a thermal treatment, under nitrogen stream, over a temperature range of 50-150° C. until a weight content of 25% of alcohol was reached.

EXAMPLES

All the compounds L used in the examples are commercially available from Aldrich.

Example 1 a) Preparation of the Intermediate Solid Component

Into a 2 L reaction vessel, purged with nitrogen, 1 L of TiCl₄ was introduced at 0° C. Then, at the same temperature, 70 g of a spherical MgCl₂/EtOH adduct containing 25% wt of ethanol, prepared as described above, were added under stirring.

The temperature was raised to 140° C. in 2 h and maintained for 60 min. Then, the stirring was discontinued, the solid product was allowed to settle and the supernatant liquid was siphoned off.

The solid residue was then washed once with heptane at 80° C. and five times with hexane at 25° C. and dried under vacuum at 30° C. and analyzed.

b) Reaction with Compound L

Into a 250 cm³ four-necked round flask, purged with nitrogen, 120 cm³ of heptane and 11.65 g of the intermediate solid component previously prepared as example 1a, were introduced at 25° C. At the same temperature, 1.23 g of 1,5-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm³ of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 2

Into a 250 cm³ four-necked round flask, purged with nitrogen, 150 cm³ of heptane and 14.96 g of the intermediate solid component previously prepared as example 1a, were introduced at 25° C. At the same temperature, 1.50 g of 1,6-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm³ of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 3

Into a 250 cm³ four-necked round flask, purged with nitrogen, 130 cm³ of heptane and 13.17 g of the intermediate solid component previously prepared as example 1a, were introduced at 25° C. At the same temperature, 1.37 g of 1,7-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm³ of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 4

Into a 250 cm³ four-necked round flask, purged with nitrogen, 155 cm³ of heptane and 15.40 g of the intermediate solid component previously prepared as example 1a, were introduced at 25° C. At the same temperature, 1.54 g of 2,6-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm³ of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 5

Into a 250 cm³ four-necked round flask, purged with nitrogen, 155 cm³ of heptane and 15.64 g of the intermediate solid component previously prepared as example 1a, were introduced at 25° C. At the same temperature, 1.57 g of 2,7-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm3 of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 6 a) Preparation of the Intermediate Solid Component

Into a 1.5 L reaction vessel, purged with nitrogen, 1 L of TiCl$_4$ was introduced at 25° C. and cooled at 0° C. Then, at the same temperature, 100 g of a spherical MgCl$_2$/EtOH adduct containing 25% wt of ethanol and prepared as described above were added under stirring.

The temperature was raised to 130° C. in 90 minutes and then decreased to 80° C. Maintaining the temperature at 80° C., 12.5 g of anhydrous AlCl$_3$ were added under stirring. The temperature was again increased to 135° C. in 40 minutes and maintained under continuous stirring for 5 hours. Then the temperature was decreased to 90° C., stirring was discontinued, the solid product was allowed to settle for 30 min. and the supernatant liquid was siphoned off. The solid residue was then washed seven times with hexane at 60° C., then dried under vacuum at 30° C. and analyzed. The results are reported in table 1.

b) Reaction with Compound L

Into a 250 cm³ four-necked round flask, purged with nitrogen, 120 cm³ of heptane and 12.15 g of the intermediate solid component previously prepared as example 7a, were introduced at 25° C. At the same temperature, 0.99 g of 1,5-dihydroxynaphthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm³ of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 7

Into a 250 cm³ four-necked round flask, purged with nitrogen, 120 cm3 of heptane and 12.12 g of the intermediate solid component previously prepared as example 7a, were introduced at 25° C. At the same temperature, 0.99 g of 2,7-dihydroxynapthalene were added.

Under stirring, the temperature was raised to 100° C. in 45 minutes and maintained for 3 hour. Then, the temperature was decreased to 80° C., the stirring was discontinued, the solid product was allowed to settle for 30 minutes and the supernatant liquid was siphoned off.

The solid was washed with 100 cm3 of anhydrous heptane and three times at 25° C. Finally, the solid was dried under vacuum and analyzed. The analytical results are reported in table 1 while the polymerization results obtained by employing it in the ethylene polymerization procedure described above are reported in table 2.

Example 8

The catalyst was prepared according to the procedure of example 7 with the difference that 1,5-dihydroxy-1,2,3,4-tetrahydronaphthalene was used instead of 2,7-dihydroxynapthalene. The analytical results are reported in table 1 while the polymerization results obtained by employing it in the ethylene polymerization procedure described above are reported in table 2.

TABLE 1

| Example | Mg (wt. %) | Ti (wt. %) | Al (wt. %) | Cl (wt. %) | OEt (wt. %) | L (wt. %) |
|---------|------------|------------|------------|------------|-------------|-----------|
| 1a | 18.5 | 7.5 | — | 66.7 | 1.0 | — |
| 1b | 16.5 | 6.7 | — | 59.1 | 0.9 | 6.4 |
| 2 | 17.1 | 6.8 | — | 59.2 | 0.9 | 2.8 |
| 3 | 17.0 | 6.7 | — | 58.2 | 0.8 | 2.5 |
| 4 | 17.3 | 6.8 | — | 62.6 | 1.0 | 4.1 |
| 5 | 17.5 | 6.9 | — | 59.6 | 0.9 | 8.0 |
| 6a | 17.1 | 6.1 | 2.4 | 63.9 | 0.9 | — |
| 6b | 15.7 | 5.7 | 2.2 | 58.1 | 0.7 | 7.2 |
| 7 | 15.3 | 5.6 | 2.2 | 57.8 | 0.6 | 7.0 |
| 8 | 15.8 | 5.4 | 2.3 | 57.9 | 0.6 | 7.2 |

TABLE 2

| Example | Pol. Procedure | Yield KgPE/gcat | MIE dg/min | BDP g/cm³ | Polymer morphology |
|---------|----------------|-----------------|------------|-----------|--------------------|
| 1a | A | 7.0 | 110 | 0.240 | Broken |
| 1b | A | 3.3 | 95 | 0.400 | Spheres |
| 2 | A | 2.5 | 150 | 0.375 | Spheres |
| 3 | A | 5.0 | 110 | 0.361 | Spheres |
| 4 | A | 3.1 | 110 | 0.403 | Spheres |
| 5 | A | 3.4 | 168 | 0.390 | Spheres |
| 6a | A | 6.0 | 116 | 0.380 | Spheres |
| 6b | A | 4.0 | 80 | 0.415 | Spheres |
| 7 | A | 4.7 | 90 | 0.395 | Spheres |
| 1a | B | 20 | 0.50 | 0.242 | Broken + Spheres |
| 1b | B | 17 | 0.70 | 0.355 | Spheres |
| 2 | B | 14 | 0.62 | 0.338 | Spheres |
| 3 | B | 22 | 0.80 | 0.310 | Spheres |

The invention claimed is:

1. A catalyst component for the polymerization of olefins $CH_2$=CHR, wherein R is hydrogen or a hydrocarbon radical having 1-12 carbon atoms, comprising Mg, Ti, Cl and a compound L or its derivatives, wherein compound L is a selected from condensed cyclic structures which are formed by at least an aromatic ring, and which are substituted with at least two hydroxy groups, said Cl and Ti atoms being present in an amount so as to have a molar ratio ranging from 5 to less than 30, wherein compound L is present in a molar ratio with respect to the titanium atoms ranging from 0.05 to 1.

2. The catalyst component according to claim 1 wherein the compound L comprises only aromatic di or polycyclic structures.

3. The catalyst component according to claim 1 wherein the compound L is selected from condensed cyclic structures wherein the hydroxy groups are positioned such that the structures do not have chelating capability.

4. The catalyst component according to claim 3 wherein the compound L is selected from condensed cyclic structures wherein the hydroxy groups are not adjacent to each other.

5. The catalyst component according to claim 1 wherein the compound L is selected from di or polyhydroxynaphthalenes, di or polyhydroxyfluorenes, or di or polyhydroxyindenes.

6. The catalyst component according to claim 1 wherein the Cl/Ti molar ratio is from 7 to 25.

7. The catalyst component according to claim 1 wherein the amount of Ti ranges from 3.5 to 8% wt based on the total weight of the catalyst component.

8. The catalyst component according to claim 1, further comprising aluminum atoms in an amount such that the Mg/Al molar ratio ranges from 1 to 35.

9. A catalyst for the polymerization of olefins $CH_2$=CHR, wherein R is hydrogen or a hydrocarbon radical having 1-12 carbon atoms, comprising the product of the reaction between (a) the solid catalyst component according to claim 1; and (b) at least one Al-alkyl compound.

10. The catalyst according to claim 9 wherein the at least one Al-alkyl compound comprises an Al-trialkyl compound.

11. A process for the polymerization of olefins $CH_2$=CHR wherein R is hydrogen or a hydrocarbon radical having 1-12 carbon atoms, carried out in the presence of the catalyst according to claim 9.

* * * * *